United States Patent
Li et al.

(10) Patent No.: US 11,538,207 B2
(45) Date of Patent: Dec. 27, 2022

(54) IMAGE PROCESSING METHOD AND APPARATUS, IMAGE DEVICE, AND STORAGE MEDIUM

(71) Applicant: BEIJING SENSETIME TECHNOLOGY DEVELOPMENT CO., LTD., Beijing (CN)

(72) Inventors: Tong Li, Beijing (CN); Wentao Liu, Beijing (CN); Chen Qian, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 92 days.

(21) Appl. No.: 17/073,769

(22) Filed: Oct. 19, 2020

(65) Prior Publication Data

US 2021/0035344 A1 Feb. 4, 2021

Related U.S. Application Data

(63) Continuation of application No. PCT/CN2019/130970, filed on Dec. 31, 2019.

(30) Foreign Application Priority Data

Mar. 14, 2019 (CN) .......................... 201910191918.1
Mar. 14, 2019 (CN) .......................... 201910193649.2

(51) Int. Cl.
*G06T 11/60* (2006.01)
*G06T 7/73* (2017.01)
(Continued)

(52) U.S. Cl.
CPC ............ *G06T 11/60* (2013.01); *G06T 7/0014* (2013.01); *G06T 7/246* (2017.01); *G06T 7/73* (2017.01);
(Continued)

(58) Field of Classification Search
CPC ...... G06V 40/10; G06V 40/176; G06V 10/24; G06V 10/754; G06T 11/60;
(Continued)

(56) References Cited

U.S. PATENT DOCUMENTS

| 4,561,066 A | 12/1985 | Emmons |
| 6,657,628 B1 | 12/2003 | Cook |

(Continued)

FOREIGN PATENT DOCUMENTS

| CN | 101930284 A | 12/2010 |
| CN | 102824176 A | 12/2012 |

(Continued)

OTHER PUBLICATIONS

Third Office Action of the Chinese application No. 201910365188.2, dated Sep. 26, 2021, 27 pgs.
(Continued)

*Primary Examiner* — Pinalben Patel
(74) *Attorney, Agent, or Firm* — Cooper Legal Group, LLC

(57) ABSTRACT

An image processing method and apparatus, a device, and a storage medium are provided. The image processing method includes: obtaining key points of a reference region of an object in an image; determining the orientation of the reference region according to the key points of the reference region; and performing deformation processing on a region to be adjusted of the object based on the orientation of the reference region, where the region to be adjusted is the same as or different from the reference region.

17 Claims, 7 Drawing Sheets

(51) Int. Cl.
*G06T 7/246* (2017.01)
*G06T 13/40* (2011.01)
*G06T 7/00* (2017.01)
*G06V 40/10* (2022.01)
*G06V 40/16* (2022.01)

(52) U.S. Cl.
CPC ............... *G06T 7/74* (2017.01); *G06T 13/40* (2013.01); *G06V 40/10* (2022.01); *G06V 40/176* (2022.01); *G06T 2200/04* (2013.01); *G06T 2207/30196* (2013.01); *G06T 2207/30201* (2013.01)

(58) Field of Classification Search
CPC . G06T 2207/20084; G06T 2207/30201; G06T 7/246; G06T 7/73; G06T 7/0014; G06T 5/00; G06T 7/74; G06T 2200/04; G06T 2207/30196; G06T 13/40
See application file for complete search history.

(56) References Cited

U.S. PATENT DOCUMENTS

| | | | |
|---|---|---|---|
| 9,058,514 | B2 | 6/2015 | Kim et al. |
| 9,177,409 | B2 | 11/2015 | Rennuit |
| 9,247,201 | B2 | 1/2016 | Li |
| 9,626,788 | B2 | 4/2017 | Corazza et al. |
| 10,022,628 | B1 | 7/2018 | Matsumiya et al. |
| 10,319,133 | B1 | 6/2019 | Fleischer |
| 10,410,359 | B2 | 9/2019 | Marks |
| 10,534,431 | B2 | 1/2020 | Erivantcev et al. |
| 2003/0152289 | A1* | 8/2003 | Luo .................... G06V 20/10 382/289 |
| 2007/0126743 | A1 | 6/2007 | Park |
| 2007/0146371 | A1 | 6/2007 | Dariush |
| 2010/0149341 | A1 | 6/2010 | Marks |
| 2010/0197391 | A1 | 8/2010 | Geiss |
| 2010/0197399 | A1 | 8/2010 | Geiss |
| 2010/0322111 | A1 | 12/2010 | Li |
| 2011/0249865 | A1 | 10/2011 | Lee |
| 2012/0218262 | A1 | 8/2012 | Yomdin |
| 2013/0195330 | A1 | 8/2013 | Kim et al. |
| 2013/0243255 | A1 | 9/2013 | Williams et al. |
| 2014/0156219 | A1* | 6/2014 | Soubra .................. G01S 19/53 702/150 |
| 2014/0219557 | A1 | 8/2014 | Liao |
| 2015/0003687 | A1 | 1/2015 | Utsunomiya et al. |
| 2015/0036879 | A1 | 2/2015 | Shiozaki et al. |
| 2015/0161797 | A1 | 6/2015 | Park |
| 2015/0199824 | A1 | 7/2015 | Kim et al. |
| 2016/0027178 | A1* | 1/2016 | Yu .................... G06T 7/0012 600/407 |
| 2016/0098095 | A1 | 4/2016 | Gonzalez-Banos et al. |
| 2016/0163084 | A1 | 6/2016 | Corazza et al. |
| 2016/0267699 | A1 | 9/2016 | Borke et al. |
| 2017/0249745 | A1* | 8/2017 | Fiala .................... G06T 7/13 |
| 2017/0270709 | A1 | 9/2017 | Tran |
| 2017/0352092 | A1* | 12/2017 | Mitchell ............... G06T 15/503 |
| 2018/0158196 | A1 | 6/2018 | Marks |
| 2018/0165860 | A1 | 6/2018 | Noh et al. |
| 2018/0225842 | A1 | 8/2018 | Wang |
| 2018/0335843 | A1 | 11/2018 | Erivantcev et al. |
| 2018/0345116 | A1 | 12/2018 | Watanabe et al. |
| 2019/0156574 | A1 | 5/2019 | Fu et al. |
| 2019/0220657 | A1* | 7/2019 | Yabuki .................. G06T 7/73 |
| 2019/0251341 | A1 | 8/2019 | Nie et al. |
| 2019/0318151 | A1* | 10/2019 | Shichijo ............... G06V 10/761 |
| 2020/0126295 | A1* | 4/2020 | Mok .................... G06T 7/564 |
| 2021/0026516 | A1 | 1/2021 | Holz |
| 2021/0166012 | A1* | 6/2021 | Piao .................... G06V 20/52 |

FOREIGN PATENT DOCUMENTS

| | | |
|---|---|---|
| CN | 103971113 A | 8/2014 |
| CN | 104700433 A | 6/2015 |
| CN | 104866101 A | 8/2015 |
| CN | 106251396 A | 12/2016 |
| CN | 108027597 A | 5/2018 |
| CN | 108205654 A | 6/2018 |
| CN | 108227931 A | 6/2018 |
| CN | 108229239 A | 6/2018 |
| CN | 108229332 A | 6/2018 |
| CN | 108305321 A | 7/2018 |
| CN | 108357595 A | 8/2018 |
| CN | 108364254 A | 8/2018 |
| CN | 108427942 A | 8/2018 |
| CN | 108472028 A | 8/2018 |
| CN | 108765274 A | 11/2018 |
| CN | 108830200 A | 11/2018 |
| CN | 108874119 A | 11/2018 |
| CN | 109035415 A | 12/2018 |
| CN | 109117726 A | 1/2019 |
| CN | 109146629 A | 1/2019 |
| CN | 109146769 A | 1/2019 |
| CN | 109242789 A | 1/2019 |
| CN | 109325450 A | 2/2019 |
| CN | 109376671 A | 2/2019 |
| CN | 109816773 A | 5/2019 |
| CN | 110139115 A | 8/2019 |
| CN | 110688008 A | 1/2020 |
| CN | 110889382 A | 3/2020 |
| JP | 2002024807 A | 1/2002 |
| JP | 2003150977 A | 5/2003 |
| JP | 2007004732 A | 1/2007 |
| JP | 2007333690 A | 12/2007 |
| JP | 2010061646 A | 3/2010 |
| JP | 2012516504 A | 7/2012 |
| JP | 2012234541 A | 11/2012 |
| JP | 2015116308 A | 6/2015 |
| JP | 2015148706 A | 8/2015 |
| JP | 2017138915 A | 8/2017 |
| JP | 2017191576 A | 10/2017 |
| JP | 2018505462 A | 2/2018 |
| JP | 2018119833 A | 8/2018 |
| JP | 2018169720 A | 11/2018 |
| WO | 2018207388 A1 | 11/2018 |

OTHER PUBLICATIONS

First Office Action of the Japanese application No. 2020-558530, dated Dec. 14, 2021, 6 pgs.
Office Action of the Indian application No. 202047053772, dated Dec. 15, 2021, 6 pgs.
English translation of the Written Opinion of the International Search Authority in the international application No. PCT/CN2019/130970, dated Apr. 1, 2020, 5 pgs.
English translation of the Written Opinion of the International Search Authority in the international application No. PCT/CN2020/072520, dated Apr. 23, 2020, 6 pgs.
English translation of the Written Opinion of the International Search Authority in the international application No. PCT/CN2020/072550, dated Apr. 21, 2020, 7 pgs.
English translation of the Written Opinion of the International Search Authority in the international application No. PCT/CN2020/072549, dated Apr. 21, 2020, 6 pgs.
English translation of the Written Opinion of the International Search Authority in the international application No. PCT/CN2020/072526, dated Apr. 21, 2020, 7 pgs.
Notice of Allowance of the Japanese application No. 2020-559380, dated Dec. 21, 2021, 5 pgs.
Non-Final Office Action of the U.S. Appl. No. 17/102,373, dated Dec. 9, 2021, 67 pgs.
"QuaterNet: A Quaternion-based Recurrent Model for Human Motion", Jul. 2018, Dario Pavilo, David Grangier and Michael Auli, British Machine Vision Conference (BMVC), available on line arXiv.org-1805.06485v2, pp. 1-14.
"Recurrent Network Models for Human Dynamics", 2015, Katerina Fragkiadaki, Sergey Levine, Panna Felsen and Jitendra Malik, Proceedings of the IEEE International Conference on Computer Vision (ICCV), pp. 4346-4354.

(56) References Cited

OTHER PUBLICATIONS

"Adversarial PoseNet: A Structure-aware Convolutional Network for Human Pose Estimation", 2017, Yu Chen, Chunhua Shen, Xiu-Shen Wei, Lingqiano Liu and Jian Yang, Proceedings of the IEEE International Conference on Computer Vision (ICCV), pp. 1221-1230.

"The Pose Knows: Video Forecasting by Generating Pose Futures", 2017, Jacob Walker, Kenneth Marino, Abhinav Gupta and Martial Hebert, Proceedings of the IEEE International Conference on Computer Vision (ICCV), pp. 3352-3361.

Non-Final Office Action of the U.S. Appl. No. 17/102,364, dated Oct. 4, 2021, 61 pgs.

Non-Final Office Action of the U.S. Appl. No. 17/102,305, dated Oct. 4, 2021, 57 pgs.

Non-Final Office Action of the U.S. Appl. No. 17/102,331, dated Oct. 6, 2021, 55 pgs.

"The Design and Implementation of a Kinect-Based Framework for Selective Human Activity Tracking", Oct. 2016, Roanna Lun, Connor Gordon and Wenbing Zhao, IEEE International Conference on Systems, Man, and Cybernetics SMC 2016, Budapest, Hungary, 6 pages.

International Search Report in the international application No. PCT/CN2019/130970, dated Apr. 1, 2020, 3 pgs.

International Search Report in the international application No. PCT/CN2020/072520, dated Apr. 23, 2020, 2 pgs.

International Search Report in the international application No. PCT/CN2020/072550, dated Apr. 21, 2020, 3 pgs.

International Search Report in the international application No. PCT/CN2020/072549, dated Apr. 21, 2020, 2 pgs.

International Search Report in the international application No. PCT/CN2020/072526, dated Apr. 21, 2020, 3 pgs.

"The design and implementation of Kinect-based motion capture system"; Apr. 2018; Zuoyun Zhang; China Master's Theses Full-text Database, Information Science, Apr. 15, 2018, 99 pgs.

"Research on Motion Control Technology of Virtual Human's Lower Limb Based on Optical Motion Capture Data" Feb. 2015; Liang Feng, Zhang Zhili, Li Xiangyang, Tang Zhibo and Ma Chao; Journal of System Simulation, vol. 27, No. 2, 9 pgs.

"Operator Attitude Algorithm for Telerobotic Nursing System"; Dec. 2016, Guo-Yu Zuo, Shuang-Yue, Yu and Dao-Xiong Gong; Acta Automatica Sinica,vol. 42, No. 12, 10 pgs.

"Based on Operational Degree of Virtual Human Hand Motion Control of Obstacle Avoidance Algorithm", 2014, Dai-Rui She, Jung-Chan Yang, Yue Shi and Da-Ling Yang, Computer Simulation, vol. 31, No. 12, 5 pgs.

"Indirect Adaptive Fuzzy Decoupling Control With a Lower Limb Exoskeleton", Aug. 2016, Chih-Wei Lin, Shun-Eng Su and Ming-Change Chen, Proceedings of 2016 International Conference on Advanced Robotics and Intelligent Systems, Taipei, Taiwan, 5 pgs.

First Office Action of the Chinese application No. 201910365188.2, dated Apr. 6, 2021, 29 pgs.

Second Office Action of the Chinese application No. 201910365188.2, dated Jul. 9, 2021, 28 pgs.

First Office Action of the Japanese application No. 2020-567116, dated Jan. 20, 2022, 12 pgs.

First Office Action of the Japanese application No. 2020-565269, dated Jan. 5, 2022, 10 pgs.

Notice of Allowance of the Japanese application No. 2020-565269, dated Apr. 12, 2022, 5 pgs.

Final Office Action of the U.S. Appl. No. 17/102,364, dated Mar. 17, 2022, 59 pgs.

Final Office Action of the U.S. Appl. No. 17/102,305, dated Mar. 15, 2022, 64 pgs.

Final Office Action of the U.S. Appl. No. 17/102,331, dated Mar. 15, 2022, 55 pgs.

Advisory Action of the U.S. Appl. No. 17/102,331, dated May 27, 2022, 4 pgs.

Advisory Action of the U.S. Appl. No. 17/102,305, dated May 27, 2022, 4 pgs.

Advisory Action of the U.S. Appl. No. 17/102,364, dated May 27, 2022, 6 pgs.

Notice of Allowance of the U.S. Appl. No. 17/102,373, dated Jun. 9, 2022, 26 pgs.

Notice of Rejection of the Japanese application No. 2020-567116, dated May 17, 2022, 7 pgs.

"Facial Expression Analysis", 2005, Ying-Li Tian, Takeo Kanade and Jeffrey F. Cohn, Chapter 11 in "Handbook of Face Recognition;" Springer, New York, NY. pages 247-275.

"Subtly Different Facial Expression Recognition and Expression Intensity Estimation", Jun. 1998, James Jenn-Jier Lien, Takeo Kanade, Jeffrey F. Cohn and Ching-Chung Li, Published in the Proceedings of the IEEE International Conference on Computer Vision and Pattern Recognition, pp. 853-859.

"A Framework for Automated Measurement of the Intensity of Non-Posed Facial Action Units", 2009, Mohammad H. Mahoor, Steven Dadavid, Daniel S. Messinger and Jeffrey F. Cohn, IEEE Conference on Computer Vision and Patten Recognition, CVPR 2009; pp. 74-80.

"Dynamic Facial Expression Analysis and Synthesis With MPEG-4 Facial Animation Parameters", Oct. 2008, Yongmian Zhang, Qiang Ji, Zhiwei Zhu and Beifang Yi, IEEE Transactions on Circuits and Systems for Video Technology, vol. 18 No. 10, pp. 1383-1396.

Non-Final Office Action of the U.S. Appl. No. 17/102,331, dated Jul. 5, 2022, 53 pgs.

"Virtual Fashion Show Using Marker-less Motion Capture", Mar. 2005, Ryuzo Okada, Bjorn Tenger, Taukasa Ike and Nobuhire Kondoh, The Institute of Electronics, Information and Communication Engineers, Technical report of IEICE, TL2004-47, PRMU2004-215, 6 pgs.

Search Report by Registered Search Organization of the Japanese application No. 2021-516694, dated Apr. 5, 2022, 34 pgs.

First Office Action of the Japanese application No. 2021-516694, dated May 18, 2022, 14 pgs.

First Office Action of the Indian application No. 202027050357, dated Sep. 10, 2021, 7 pgs.

First Office Action of the Indian application No. 202027050400, dated Dec. 13, 2021, 6 pgs.

First Office Action of the Indian application No. 202027050399, dated Sep. 6, 2021, 6 pgs.

First Office Action of the Indian application No. 202027050802, dated Sep. 27, 2021, 6 pgs.

Non-Final Office Action of the U.S. Appl. No. 17/102,305, dated Aug. 4, 2022, 43 pgs.

Non-Final Office Action of the U.S. Appl. No. 17/102,364, dated Aug. 18, 2022, 59 pgs.

Notice of Allowance of the U.S. Appl. No. 17/102,373, dated Sep. 14, 2022, 11 pgs.

\* cited by examiner

IMAGE PROCESSING METHOD AND APPARATUS, IMAGE DEVICE, AND STORAGE MEDIUM

CROSS-REFERENCE TO RELATED APPLICATION

This is a continuation application of International Patent Application No. PCT/CN2019/130970, filed on Dec. 31, 2019, which claims priority to Chinese Application No. 201910191918.1, filed with the Chinese Patent Office on Mar. 14, 2019, and priority to Chinese Application No. 201910193649.2, filed with the Chinese Patent Office on Mar. 14, 2019. The contents of International Patent Application No. PCT/CN2019/130970, Chinese Application No. 201910191918.1, and Chinese Application No. 201910193649.2 are incorporated herein by reference in their entireties.

BACKGROUND

When deformation is performed on a region covered by an object in an image, the deformation is generally performed based on a user's manual operation. For example, image processing software, such as Photoshop, largely depends on operating skills of a user, and it is too difficult to operate for a general user. In the related art, another image processing software appears, and the image processing software performs overall processing on an image merely if the user performs one-key operation. However, since the operation is performed by an electronic device, due to the limitation in the mechanicalness (i.e., lack of intelligence) of processing of the device, the effect of the processed image is a bit weird, and the processing effect of the image is not as expected.

SUMMARY

The present disclosure relates to the field of information technology, and in particular, to an image processing method and apparatus, a device, and a storage medium.

Embodiments of the present disclosure expect to provide an image processing method and apparatus, a device, and a storage medium.

According to one aspect, provided is an image processing method, including:

obtaining key points of a reference region of an object in an image;

determining an orientation of the reference region according to the key points of the reference region; and performing deformation processing on a region to be adjusted of the object based on the orientation of the reference region, wherein the region to be adjusted is the same as or different from the reference region.

According to a second aspect, provided is an image processing apparatus, including:

an obtaining unit, configured to obtain key points of a reference region of an object in an image;

a determining unit, configured to determine an orientation of the reference region according to the key points of the reference region; and a processing unit, configured to perform deformation processing on a region to be adjusted of the object based on the orientation of the reference region, where the region to be adjusted is the same as or different from the reference region.

According to a third aspect, provided is an image processing device, including:

a memory; and a processor, connected to the memory, and configured to execute computer executable instructions stored on the memory to implement the image processing method provided according to any of the foregoing technical solutions.

According to a fourth aspect, provided is a computer storage medium, where the computer storage medium stores computer executable instructions, and the computer executable instructions can implement the image processing method provided according to any of the foregoing technical solutions.

BRIEF DESCRIPTION OF DRAWINGS

To describe the technical solutions in embodiments or the background art of the present application more clearly, the accompanying drawings required for describing the embodiments or the background art of the present application are introduced below.

The drawings here incorporated in the specification and constituting a part of the specification describe the embodiments of the present disclosure and are intended to explain the technical solutions of the present disclosure together with the specification.

DETAILED DESCRIPTION

Figure 1:
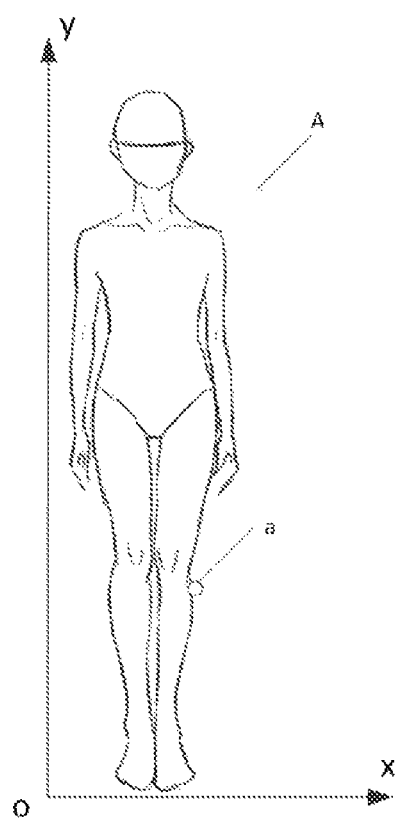
FIG. 1 is a schematic diagram of a pixel coordinate system provided in embodiments of the present disclosure.

According to one aspect, provided is an image processing method, including:

obtaining key points of a reference region of an object in an image;

determining an orientation of the reference region according to the key points of the reference region; and performing deformation processing on a region to be adjusted of the object based on the orientation of the reference region, wherein the region to be adjusted is the same as or different from the reference region.

According to any of implementations in the present application, determining the orientation of the reference region according to the key points of the reference region includes: obtaining at least three key points in the reference region, where the at least three key points are not on a same straight line;

determining a target vector based on the at least three key points; and taking a direction of the target vector as the orientation of the reference region.

According to any of the implementations in the present application, the at least three key points include a first key point, a second key point, and a third key point, and the first key point and the third key point are symmetrical about the second key point;

determining the target vector based on the at least three key points includes:

constructing a first vector based on the first key point and the second key point;

constructing a second vector based on the third key point and the second key point; and determining the target vector based on the first vector and the second vector.

According to any of the implementations in the present application, determining the target vector based on the first vector and the second vector includes:

obtaining the target vector by performing a cross product on the first vector and the second vector.

According to any of the implementations in the present application, performing the deformation processing on the region to be adjusted of the object based on the orientation of the reference region includes:

determining the orientation of the region to be adjusted based on the orientation of the reference region; and performing the deformation processing on the region to be adjusted of the object based on the orientation of the region to be adjusted.

According to any of the implementations in the present application, determining the orientation of the region to be adjusted based on the orientation of the reference region includes:

in response to the region to be adjusted being a region of a first type, determining that the orientation of the region to be adjusted is opposite to the orientation of the reference region, where the region of the first type includes: a hip region; and in response to the region to be adjusted being a region of a second type, determining that the orientation of the region to be adjusted is the same as the orientation of the reference region, where the region of the second type includes at least one of: a face region, a shoulder region, or a crotch region.

According to any of the implementations in the present application, performing the deformation processing on the region to be adjusted of the object based on the orientation of the reference region includes:

performing the deformation processing on the region to be adjusted according to the target vector, a first reference vector, and a second reference vector, where a direction of the first reference vector is perpendicular to a photographing direction of the image, and the direction of the first reference vector is opposite to a direction of the second reference vector.

According to any of the implementations in the present application, the region to be adjusted includes a first sub-region and a second sub-region, and the first sub-region and the second sub-region are symmetrical about a center line of the region to be adjusted; performing the deformation processing on the region to be adjusted according to the target vector, the first reference vector, and the second reference vector includes:

in response to the direction of the target vector being different from the direction of the first reference vector, and the direction of the target vector being different from the direction of the second reference vector, adjusting an area of the first sub-region and an area of the second sub-region according to a first included angle between the target vector and the first reference vector and a second included angle between the target vector and the second reference vector.

According to any of the implementations in the present application, in response to the direction of the target vector being different from the direction of the first reference vector and the direction of the target vector being different from the direction of the second reference vector, adjusting the area of the first sub-region and the area of the second sub-region according to the first included angle between the target vector and the first reference vector and the second included angle between the target vector and the second reference vector includes:

determining a first area adjustment amount of the first sub-region and a second area adjustment amount of the second sub-region according to the first included angle and the second included angle; and adjusting the area of the first sub-region according to the first area adjustment amount and adjusting the area of the second sub-region according to the second area adjustment amount.

According to any of the implementations in the present application, determining the first area adjustment amount of the first sub-region and the second area adjustment amount of the second sub-region according to the first included angle and the second included angle includes:

in response to the first included angle being greater than the second included angle and the area of the first sub-region being greater than the area of the second sub-region, taking a ratio of the first area adjustment amount to the second area adjustment amount as a first ratio, and taking a ratio of the first included angle to the second included angle as a second ratio; and determining the first area adjustment amount and the second area adjustment amount according to the second ratio so that the first ratio is positively correlated with the second ratio.

According to any of the implementations in the present application, the method further includes:

in response to the first included angle being equal to the second included angle and the area of the first sub-region being equal to the area of the second sub-region, determining that the first area adjustment amount is equal to the second area adjustment amount.

According to a second aspect, provided is an image processing apparatus, including:

an obtaining unit, configured to obtain key points of a reference region of an object in an image;

a determining unit, configured to determine an orientation of the reference region according to the key points of the reference region; and a processing unit, configured to perform deformation processing on a region to be adjusted of the object based on the orientation of the reference region, where the region to be adjusted is the same as or different from the reference region.

According to any of the implementations in the present application, the determining unit is configured to:

obtain at least three key points in the reference region, where the at least three key points are not on a same straight line;

determine a target vector based on the at least three key points; and take a direction of the target vector as the orientation of the reference region.

According to any of implementations in the present application, the at least three key points include a first key point, a second key point, and a third key point, and the first key point and the third key point are symmetrical about the second key point;

the determining unit is configured to:

construct a first vector based on the first key point and the second key point;

construct a second vector based on the third key point and the second key point; and determine the target vector based on the first vector and the second vector.

According to any of the implementations in the present application, the determining unit is configured to:

obtain the target vector by performing a cross product on the first vector and the second vector.

According to any of the implementations in the present application, the processing unit is configured to:

determine the orientation of the region to be adjusted based on the orientation of the reference region; and perform the deformation processing on the region to be adjusted of the object based on the orientation of the region to be adjusted.

According to any of the implementations in the present application, the processing unit is configured to:

in response to the region to be adjusted being a region of a first type, determine that the orientation of the region to be adjusted is opposite to the orientation of the reference region, where the region of the first type includes: a hip region;

in response to the region to be adjusted being a region of a second type, determine that the orientation of the region to be adjusted to be same as the orientation of the reference region, where the region of the second type includes at least one of: a face region, a shoulder region, or a crotch region.

According to any of the implementations in the present application, the processing unit is configured to:

perform the deformation processing on the region to be adjusted according to the target vector, a first reference vector, and a second reference vector, where a direction of the first reference vector is perpendicular to a photographing direction of the image, and the direction of the first reference vector is opposite to a direction of the second reference vector.

According to any of the implementations in the present application, the region to be adjusted comprises a first sub-region and a second sub-region, and the first sub-region and the second sub-region are symmetrical about a center line of the region to be adjusted;

the processing unit is configured to:

in response to the direction of the target vector being different from the direction of the first reference vector, and the direction of the target vector being different from the direction of the second reference vector, adjust an area of the first sub-region and an area of the second sub-region according to a first included angle between the target vector and the first reference vector and a second included angle between the target vector and the second reference vector.

According to any of the implementations in the present application, the processing unit is configured to:

determine a first area adjustment amount of the first sub-region and a second area adjustment amount of the second sub-region according to the first included angle and the second included angle; and adjust the area of the first sub-region according to the first area adjustment amount and adjust the area of the second sub-region according to the second area adjustment amount.

According to any of the implementations in the present application, the processing unit is configured to:

in response to the first included angle being greater than the second included angle and the area of the first sub-region being greater than the area of the second sub-region, take a ratio of the first area adjustment amount to the second area adjustment amount as a first ratio, and take a ratio of the first included angle to the second included angle as a second ratio; and determine the first area adjustment amount and the second area adjustment amount according to the second ratio so that the first ratio is positively correlated with the second ratio.

According to any of the implementations in the present application, the processing unit is further configured to:

in response to the first included angle being equal to the second included angle, determine that the first area adjustment amount is equal to the second area adjustment amount.

According to a third aspect, provided is an image processing device, including:

a memory; and a processor, connected to the memory, and configured to execute computer executable instructions stored on the memory to implement the image processing method provided according to any of the foregoing technical solutions.

According to a fourth aspect, provided is a computer storage medium, where the computer storage medium stores computer executable instructions, and the computer executable instructions can implement the image processing method provided according to any of the foregoing technical solutions.

According to the technical solutions provided in the embodiments of the present disclosure, before performing deformation on the region to be adjusted, the orientation of the reference region is obtained, and the deformation is performed on the region to be adjusted according to the orientation of the reference region. In this way, weird visual deformation effects generated by direct deformation regardless of the orientation of the reference region are reduced, so as to reduce the occurrence of weird deformation and improve an image effect after the deformation.

The technical solutions of the present disclosure are further described in detail below with reference to the accompanying drawings and the specific embodiments.

Before performing the following descriptions, a pixel coordinate system in embodiments of the present disclosure is defined. As shown in FIG. 1, a pixel coordinate system xoy is constructed by taking a lower left corner of a human body image A as an origin o of the pixel coordinate system, a direction parallel to the row of the human body image A as the direction of an x-axis, and a direction parallel to the column of the human body image A as the direction of a y-axis. In the pixel coordinate system, the abscissa is used for representing a column number in the human body image A of a pixel in the human body image A; the ordinate is used for representing a row number in the human body image A of the pixel in the human body image A; and the units of the abscissa and the ordinate may both be pixels. For example, assuming that the coordinates of a pixel a in FIG. 1 is (10, 30), the abscissa of the pixel a is 30 pixels, the ordinate of the pixel a is 20 pixels, and the pixel a is a pixel of column 30 and row 20 in the human body image A.

Figure 2:
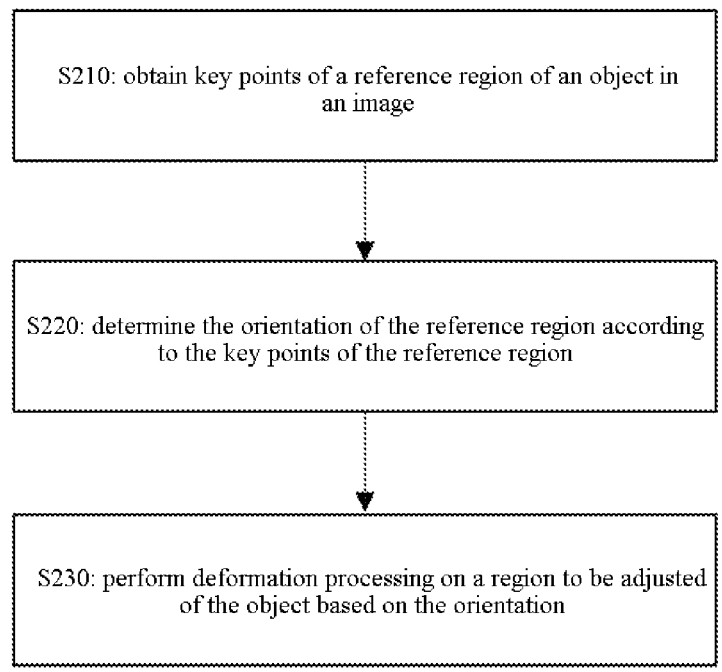
FIG. 2 is a schematic flowchart of an image processing method provided in the embodiments of the present disclosure.

As shown in FIG. 2, the embodiments provide an image processing method, including the following operations.

At operation S210, key points of a reference region of an object in an image are obtained.

At operation S220, the orientation of the reference region is determined according to the key points of the reference region.

At operation S230, deformation processing is performed on a region to be adjusted of the object based on the orientation.

The image processing method provided in the embodiments can be applied to various types of electronic devices capable of processing images, for example, various user equipments such as a mobile phone, a tablet computer, or a wearable device.

Obtaining the key point of the reference region of the image in operation S210 includes: detecting the key point of the reference region using a deep learning model such as a neural network. For example, taking the reference region being a living being as an example, the key points may be key points of a skeleton of the reference region.

If the key points are detected, the key points are connected to form the skeleton of the reference region.

If the image is a 2D image, the key points may be 2D key points.

If the image is a 3D image, the key points may be 3D key points.

The 3D image may be constituted by an RGB image and a depth image corresponding to the RGB image, or a YUV image and a depth image corresponding to the YUV image.

A pixel value of the depth may be the value of a distance between a camera which is to capture the RGB image or the YUV image and an object to be captured, and such a pixel value representing a distance may be called as a depth value. For example, the 3D image may be captured based on a depth camera. In addition to a general 2D camera which captures the RGB image or the YUV image, the depth camera further includes other depth cameras for capturing a deep image, for example, a Time of Flight (TOF) camera.

The 2D key point is (x, y), and the 3D key point may be (x, y, z). The coordinates of the 2D key point is the coordinates of a plane coordinate system, and the coordinates of the 3D key point is the coordinates in a 3D coordinate system.

Figure 3:
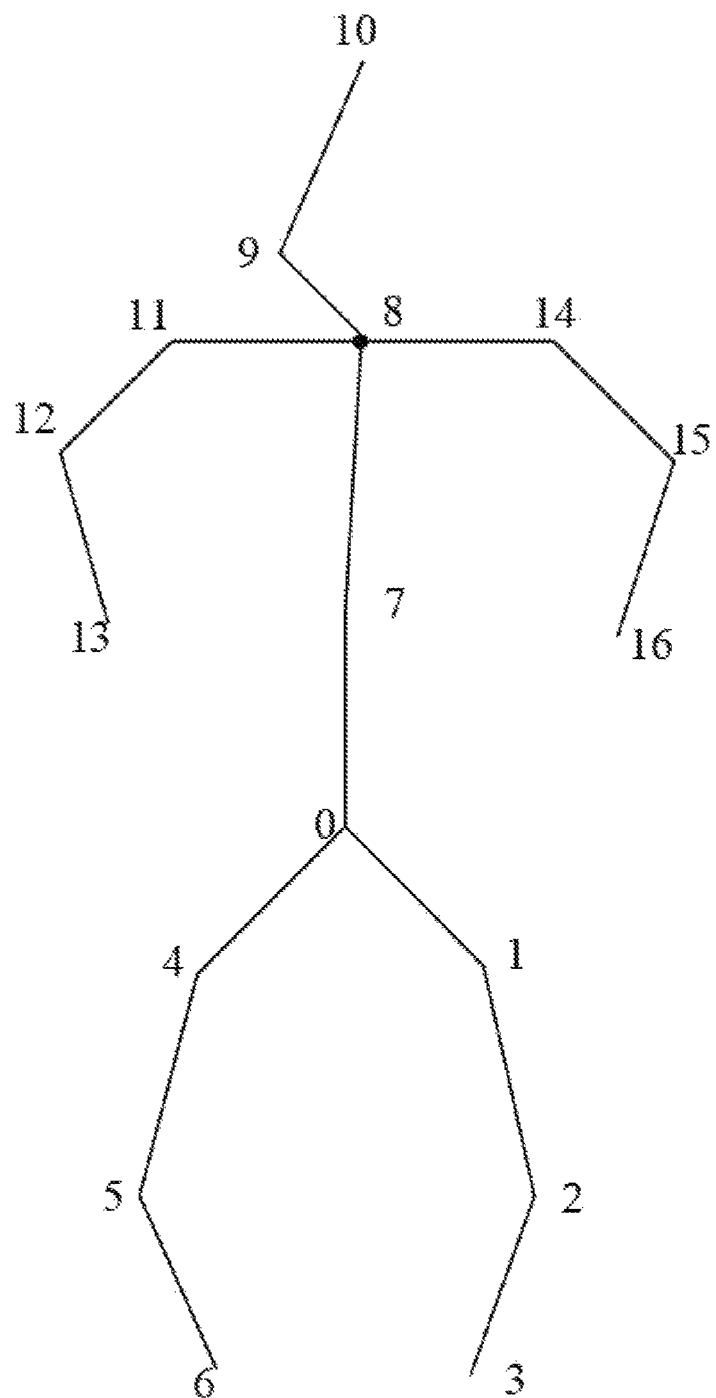
FIG. 3 is a schematic diagram of key points provided in the embodiments of the present disclosure.

FIG. 3 is a schematic diagram of a skeleton of a human body. FIG. 3 shows a schematic diagram displaying 17 skeleton key points, which are respectively numbered 0-16, on a skeleton of a human body, where the skeleton key point numbered 0 is also called as a number 0 key point or a root node. Key points 11 and 14 respectively correspond to two shoulder key points of the skeleton of the human body. Key points 1 and 4 respectively correspond to two crotch key points. Key point 7 corresponds to a torso center key point. Key points 8 and 9 respectively correspond to two end points of the neck. Key point 10 is a head key point.

In the embodiments, a region covered by an object in an image includes a key point region, where the object includes a person or an animal, the key point region includes key points, and the key point region includes at least one of: a face region, a shoulder region, or a crotch region. The reference region is the key point region nearest to the region to be adjusted.

In a possible implementation, according to the coordinates of the center point of the region to be adjusted (hereinafter referred to as a first center point) and the coordinates of the center point of the key point region (hereinafter referred to as a second center point), a distance between the first center point and the second center point is determined as the distance between the region to be adjusted and the key point region.

In a possible implementation, the shortest distance between the region to be adjusted and the key point region is taken as the distance between the region to be adjusted and the key point region.

Taking a human body as an example, the orientation of the reference region includes at least one of:
the orientation of the face region,
the orientation of the shoulder region,
the orientation of the crotch region, or the like.

Optionally, the crotch region includes a waist and abdomen region.

Performing deformation on the region to be adjusted may include: performing pixel transformation on an image region including the region to be adjusted to yield a visual deformation effect.

In some embodiments, the pixel transformation may be performed using the following method.

A deformation mesh is used to assist the deformation processing on the region to be adjusted. Mesh points in the deformation mesh are control points of the deformation processing, and the change of the coordinates of the control points directly determines the transformation of pixel coordinates of pixels in the mesh where the control points are located.

In the embodiments, the pixel transformation corresponding to a certain control point can be determined based on a deformation interpolation algorithm. The deformation interpolation algorithm may be a spline curve algorithm.

The deformation mesh may be a crisscrossed mesh. Intersections of crisscrossed deformation lines are the control points of the deformation mesh. The mapping of the pixel coordinates of the pixels included in the mesh where the control points are located can be controlled by the coordinate mapping of the control points. When adjusting the control points, coordinate adjustment in at least two directions can be performed, so that the zooming in or zooming out of the region to be adjusted can be at least achieved. The zooming in of the region to be adjusted can obtain a visual zooming in effect, and the zooming out of the region to be adjusted can obtain a visual zooming out effect of the region to be adjusted. In the embodiments, since the deformation processing on the region to be adjusted can be performed according to the orientation of the reference region, the deformation processing on the region to be adjusted can be accurately performed according to the orientation of the reference region to reduce, with respect to the direct deformation processing regardless of the orientation of the reference region, the weird deformation processing caused by not taking the orientation of the reference region into consideration, so as to improve the quality of the image after the deformation processing.

In this embodiment, in order to improve the quality of the image after the deformation processing, the deformation processing is performed on the region to be adjusted according to the orientation of the region to be adjusted. Because the region to be adjusted may not include key points, the orientation of the region to be adjusted may not be determined according to the region to be adjusted. Because the reference region includes key points, the orientation of the region to be adjusted may be determined according to the orientation of the reference region.

In a possible implementation, the opposite direction of the orientation of the reference region may be taken as the orientation of the region to be adjusted. For example, if the region to be adjusted is the hip region and the reference region is the crotch region, the opposite direction of the orientation of the crotch region may be taken as the orientation of the region to be adjusted.

In another possible implementation, the orientation of the reference region may be taken as the orientation of the region to be adjusted. For example, if the region to be adjusted is a chest and the reference region is a shoulder region, the orientation of the shoulder region may be taken as the orientation of the region to be adjusted.

In conclusion, in the embodiments, the orientation of the reference region in the image can be determined according to the key points. Performing the deformation processing on the region to be adjusted is performing the deformation processing in different directions on the region to be adjusted according to the orientation, rather than performing the same deformation processing on all parts of the region to be adjusted.

Figure 4:
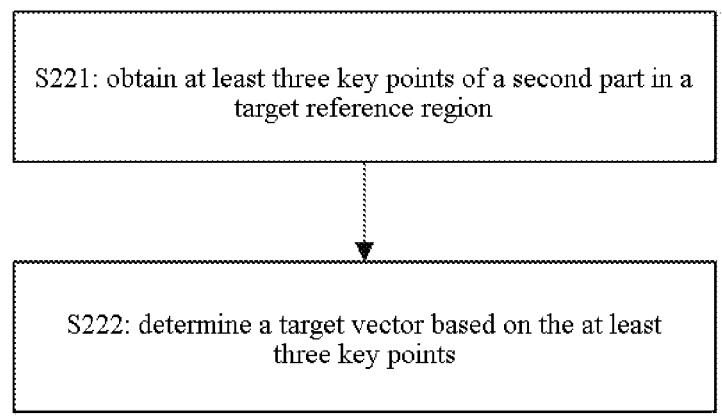
FIG. 4 is a schematic flowchart of another image processing method provided in the embodiments of the present disclosure.

In some embodiments, as shown in FIG. 4, operation S220 may include the following operations.

At operation S221, at least three key points in the reference region are obtained.

At operation S222, a target vector is determined based on the at least three key points, where the at least three key points are not on a same straight line. A target vector can be determined based on the at least three key points, and the direction of the target vector is taken as the orientation of the reference region.

In the present disclosure, the region to be adjusted can be classified into at least two types according to the orientation: a region of a first type and a region of a second type, where the orientation of the region of the first type is opposite to the orientation of the face region, and the orientation of the region of the second type is the same as the orientation of the face region. Optionally, the region of the first type includes: the hip region. The region of the second type includes: the face region, the shoulder region, or the crotch region.

Because the orientation of the reference region is the same as the orientation of the face region, determining the orientation of the region to be adjusted according to the orientation of the reference region includes: if the region to be adjusted is the region of the first type, taking the opposite direction of the orientation of the reference region as the orientation of the region to be adjusted; and if the region to be adjusted is the region of the second type, taking the orientation of the reference region as the orientation of the region to be adjusted.

For example, if the region to be adjusted is the hip region and the reference region is the crotch region, because the region to be adjusted is the region of the first type, the opposite direction of the orientation of the reference region is taken as the direction of the region to be adjusted. For another example, if the region to be adjusted is the chest region and the reference region is the shoulder region, because the region to be adjusted is the region of the second type, the orientation of the reference region is taken as the direction of the region to be adjusted.

It should be understood that the reference region and the region to be adjusted may be same or different. For example, if the region to be adjusted is the shoulder region, the reference region may also be the shoulder region. The target vector can be determined based on at least three key points in the shoulder region, so that the orientation of the region to be adjusted can be determined according to the orientation of the target vector. For another example, if the region to be adjusted is a leg region, the reference region may be the crotch region. The target vector is determined based on at least three key points in the crotch region, the direction of the target vector is taken as the orientation of the crotch region, and the orientation of the leg region is determined according to the orientation of the crotch region.

In some other embodiments, operation S220 may further include the following operation.

At operation S223, the orientation of the region to be adjusted is determined according to the orientation of the target vector. In this case, operation S230 may include: performing deformation processing on the region to be adjusted based on the orientation of the target vector.

In the embodiments, if the region to be adjusted is the region of the first type, the opposite direction of the target vector is taken as the orientation of the region to be adjusted. If the region to be adjusted is the region of the second type, the direction of the target vector is taken as the orientation of the region to be adjusted.

In the embodiments, if it is difficult to determine the orientation of the region to be adjusted, the orientation of the region to be adjusted can be determined according to the orientation of the reference region so as to improve the processing efficiency.

Certainly, in some embodiments, the deformation processing of the region to be adjusted may also be performed directly according to the orientation of the reference region without mapping the orientation of the reference region as the orientation of the region to be adjusted. In the embodiments, in order to reduce processing operations, the deformation processing of the region to be adjusted may be performed by using the orientation of the reference region.

In some embodiments, the at least three key points include a first key point, a second key point, and a third key point, where the first key point and the third key point are symmetrical about the second key point. Operation S220 may include:

constructing a first vector based on the first key point and the second key point in the reference region;

constructing a second vector based on the third key point and the second key point in the reference region; and determining the target vector based on the first vector and the second vector.

The first key point, the second key point, and the third key point can form at least two vectors, and the at least two vectors are not on a same straight line, so that they can form a plane.

Figure 5:
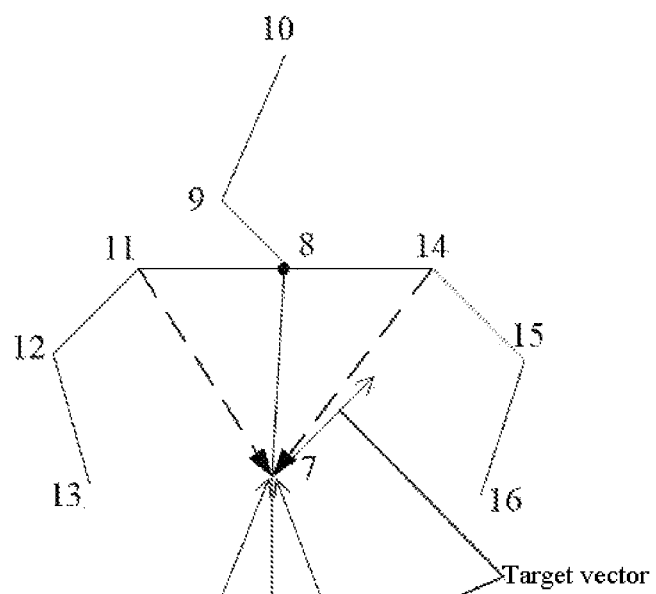
FIG. 5 is a schematic diagram of determination of an orientation based on a vector formed by key points provided in the embodiments of the present disclosure.
Figure 5:
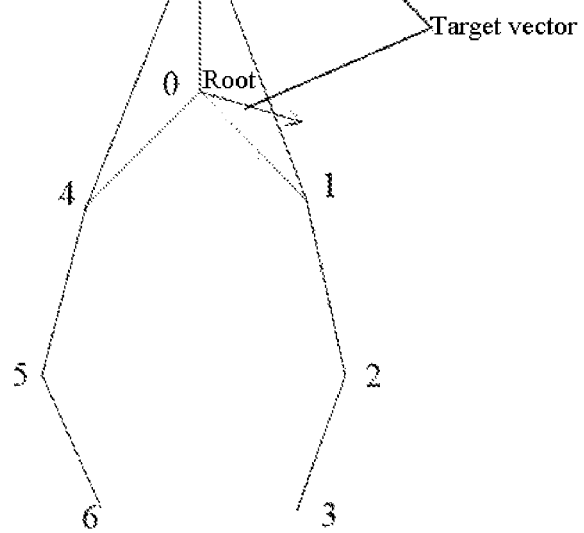

For example, taking the crotch region of the human body being the reference region as an example, for the first key point, the second key point, and the third key point, the key point 1 of a left crotch shown in FIG. 3 is taken as the first key point, the root node 0 or the torso center key point 7 shown in FIG. 3 is taken as the second key point, and the key point 4 of a right crotch shown in FIG. 3 is taken as the third key point. As shown in FIG. 5, when the orientation of the crotch is determined, the target vector is obtained based on the first vector (the vector from the key point 4 to the key point 7) and the second vector (the vector from the key point 1 to the key point 7).

As shown in FIG. 5, in the reference region, the third key point and the first key point are located on either side of the second key point, and the second key point is taken as a symcenter of the central symmetry between the third key point and the first key point. For example, taking a human body as an example, if the left crotch and the right crotch are symmetrically distributed with respect to a waist center point, the corresponding left crotch key point and right crotch key point are symmetrically distributed with respect to the waist center point.

In some embodiments, as shown in FIG. 5, if the reference region is the crotch, the first vector may be the vector from the key point 4 to the key point 7, the second vector may be the vector from the key point 1 to the key point 7, and the third vector may be a vector of the key point 7 perpendicular to a plane formed by the key point 1, the key point 4, and the key point 7.

In some embodiments, if the reference region is the crotch, the first vector may be the vector from the key point 4 to the key point 0, and the second vector may be the vector from the key point 1 to the key point 0.

In some other embodiments, if the reference region is the shoulder, the first vector may be the vector from the key point 11 to the key point 7, and the second vector may be the vector from the key point 14 to the key point 7.

In the embodiments, symmetrical parts of a living being are taken as an example. Therefore, during selecting the key points of the reference region, the selected first key point and third key point are symmetrical about the second key point in the reference region.

In some other embodiments, a plane is constructed based on the first vector and the second vector, and the normal vector of the plane may be the orientation of the reference region.

For example, determining the orientation of the reference region based on the first vector and the second vector includes:

obtaining the target vector by performing a cross product on the first vector and the second vector.

In the embodiments, the normal vector of the plane formed by the first vector and the second vector is obtained as the target vector by performing the cross product on the first vector and the second vector such that the orientation of the reference region can be obtained according to the direction of the target vector.

In some other embodiments, operation S230 may further include:

performing the deformation processing on the region to be adjusted according to the target vector, a first reference vector, and a second reference vector, where the direction of the first reference vector is perpendicular to a photographing direction of the image, and the direction of the first reference vector is opposite to the direction of the second reference vector.

The photographing direction is the direction of a direction vector of an optical axis of an imaging device (including, a camera, a camera lens, and a video camera) photographing the foregoing image.

In the embodiments, the shape of the region to be adjusted can be adjusted by performing deformation processing on the region to be adjusted. Adjusting the shape of the region to be adjusted includes at least one of: zooming in the area of the region to be adjusted, zooming out the area of the region to be adjusted, and adjusting the contour of the region to be adjusted For example, a thin user may have a demand for hip enlargement and the like, and deformation processing can be performed on the image including the user to zoom in the hip region in the image. For another example, a plump user may have a demand for a thin hip and the like, and deformation processing can be performed on the image including the user to zoom out the hip region in the image.

For example, a thin user may have a demand for breast enlargement and the like, and deformation processing can be performed on the image including the user to zoom in the chest region in the image. For another example, a plump user may have a demand for thin breast and the like, and deformation processing can be performed on the image including the user to zoom out the chest region in the image.

Figure 6:
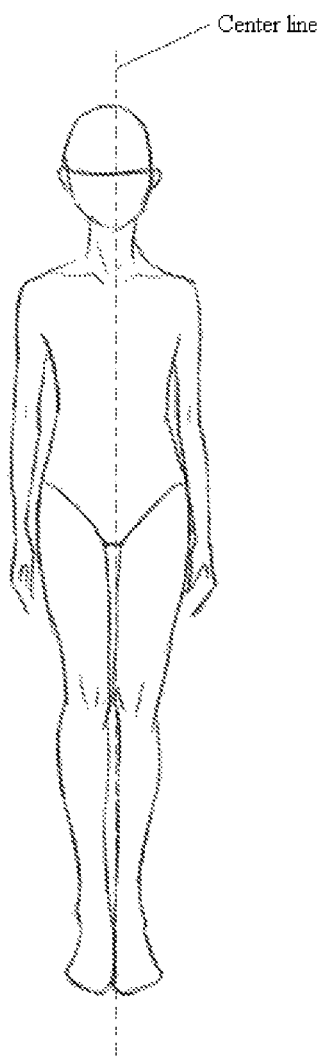
FIG. 6 is a schematic diagram of a center line provided in the embodiments of the present disclosure.

Because the region to be adjusted is a symmetrical region, the region to be adjusted can be divided into a first sub-region and a second sub-region. As shown in FIG. 6, the regions to be adjusted in the human body are symmetrical about the center line, i.e., the regions to be adjusted are symmetrical about the center line.

For example, taking the region to be adjusted being a hip as an example, if the first sub-region is the left hip, the second sub-region is the right hip, and if the first sub-region is the right hip, the second sub-region is the left hip. For another example, taking the region to be adjusted being the chest as an example, if the first sub-region is the right chest of the human body, the second sub-region is the left chest of the human body, and if the first sub-region is the left chest of the human body, the second sub-region is the right chest of the human body. It should be noted that: the left hip, the right hip, the left chest, and the right chest of the human body herein are distinguished by left and right parts of the human body.

If the orientation of the region to be adjusted is the same as the photographing direction, or the orientation of the region to be adjusted is opposite to the photographing direction, the first sub-region is the same as the second sub-region. In this case, the same deformation processing is performed on the first sub-region and the second sub-region. If the orientation of the region to be adjusted is different from the photographing direction, or the orientation of the region to be adjusted is different from the opposite direction of the photographing direction, the first sub-region is different from the second sub-region (including different areas and different contours). If the same deformation processing is performed on the first sub-region and the second sub-region, distortion occurs in the region to be adjusted after the deformation processing (for example, the proportion of the region to be adjusted after the deformation processing is not harmonious). Therefore, the deformation processing on the first sub-region and the deformation processing on the second sub-region are determined according to the area of the first sub-region and the area of the second sub-region, so as to reduce the probability of the occurrence of distortion in the region to be adjusted after the deformation processing.

In a possible implementation, according to the included angle between the target vector and the first reference vector (hereinafter referred to as a first included angle) and an included angle between the target vector and the second reference vector (hereinafter referred to as a second included angle), the size relationship between the area of the first sub-region and the area of the second sub-region (hereinafter referred to as an area relationship) is determined, and thus the deformation processing of the first sub-region and the deformation processing of the second sub-region are determined according to the area relationship.

In the embodiments of the present disclosure, the deformation processing includes adjusting the area of the region to be adjusted, i.e., including adjusting the area of the first sub-region and adjusting the area of the second sub-region. According to the ratio between the area of the first sub-region and the area of the second sub-region (hereinafter referred to as a first area ratio), the ratio of an area adjustment amount of the first sub-region to an area adjustment amount of the second sub-region (hereinafter referred to as a second area ratio) is determined. By making the second area ratio to be positively correlated with the first area ratio, the proportion of the first sub-region after the deformation processing and the second sub-region after the deformation processing (including the ratio of the area of the first sub-region after the deformation processing to the area of the second sub-region after the deformation processing) is more harmonious, thereby reducing the probability of the occurrence of distortion of the region to be adjusted after the deformation processing, and achieving a more natural deformation processing effect.

In a possible implementation, the area adjustment amount of the first sub-region (hereinafter referred to as a first area adjustment amount) and the area adjustment amount of the second sub-region (hereinafter referred to as a second area adjustment amount) are determined according to the first included angle and the second included angle. The area of the first sub-region is adjusted according to the first area adjustment amount and the area of the second sub-region is adjusted according to the second area adjustment amount, thereby achieving the deformation processing of the region to be adjusted.

If the first included angle is equal to the second included angle, it indicates that the target vector is perpendicular to the first reference vector and the target vector is perpendicular to the second reference vector, i.e., the area of the first sub-region is equal to the area of the second sub-region. Therefore, the first area adjustment amount may be made to be equal to the second area adjustment amount. For example, if the orientation of the crotch region is the same as the photographing direction, the first included angle is equal to the second included angle. In this case, the first area adjustment amount is equal to the second area adjustment amount. Therefore, if the left hip region extends outwardly, the right hip region also extends outwardly, and if the left hip region narrows inwardly, the right hip region also narrows inwardly.

If the direction of the target vector is the same as the direction of the first reference vector, or the direction of the target vector is the same as the direction of the second reference vector, it indicates that the image merely include one of the first sub-region and the second sub-region. In this case, merely the first sub-region or the second sub-region is required to be adjusted. For example, taking the hip as an example, if the image merely includes the right hip region, merely the right hip region (i.e., one of the first sub-region and the second sub-region) is required to be adjusted, and if the image merely includes the left hip region, merely the left hip region is required to be adjusted.

If the first included angle is not equal to the second included angle, the direction of the target vector is different from the direction of the first reference vector and the direction of the target vector is different from the direction of the second reference vector, it indicates that the area of the first sub-region is not to be equal to the area of the second sub-region. The bigger the difference between the first included angle and the second included angle, the bigger the difference between the area of the first sub-region and the area of the second sub-region. In order to make the proportion of the region to be adjusted after the deformation processing harmonious, the first area adjustment amount and the second area adjustment amount can be determined according to the difference between the first included angle and the second included angle (hereinafter referred to as an included angle difference). In a possible implementation, the ratio of the first included angle to the second included angle is taken as a second ratio, and the second ratio is positively correlated with the included angle difference. Therefore, the first area adjustment amount and the second area adjustment amount can be determined according to the second ratio. The ratio of the first area adjustment amount to the second area adjustment amount is taken as a first ratio. The first area adjustment amount and the second area adjustment amount can be determined according to the second ratio so that the first ratio is positively correlated with the second ratio. For example, the first ratio=the second ratio*c, where c is a positive number. In another possible implementation, if the sub-region having a bigger area in the first sub-region and the second sub-region is taken as a big sub-region, and the sub-region having a smaller area in the first sub-region and the second sub-region is taken as a small sub-region, the absolute value of the included angle difference is positively correlated with the area of the big sub-region, and the absolute value of the included angle difference is negatively correlated with the area of the small sub-region. Therefore, according to the absolute value of the included angle difference, the area adjustment amount of the big sub-region and the area adjustment amount of the small sub-region (i.e., the first area adjustment amount and the second area adjustment amount) are determined to make the area adjustment amount of the big sub-region positively correlated with the absolute value of the included angle difference, and the area adjustment amount of the small sub-region negatively correlated with the absolute value of the included angle difference. For example, the area adjustment amount of the big region=the absolute value of the included angle difference*d, where d is a positive number, and the area adjustment amount of the small region=1/the absolute value of the included angle difference.

Taking the region to be adjusted being the chest region as an example, it is assumed that the left chest region is the first sub-region, and the right chest region is the second sub-region. If the area of the left chest region is greater than the area of the right chest region, the first area adjustment amount is greater than the second area adjustment amount, and if the area of the left chest region is smaller than the area of the right chest region, the first area adjustment amount is smaller than the second area adjustment amount.

Taking the region to be adjusted being the hip region as an example, it is assumed that the left hip region is the first sub-region, and the right hip region is the second sub-region. If the area of the left hip region is greater than the area of the right hip region, the first area adjustment amount is greater than the second area adjustment amount, and if the area of the left hip region is smaller than the area of the right hip region, the first area adjustment amount is smaller than the second area adjustment amount.

The above case that the region to be adjusted is the chest and the hip is taken as an example for description. In the specific implementation, the region to be adjusted is not limited to the hip and the chest. For example, the region to be adjusted may further include: the shoulder region, the leg region, the back region or the like.

It should be understood that, in the embodiments, the implementation of adjusting the area of the region to be adjusted includes at least one of: adjusting the area of the region to be adjusted while keeping the shape of the contour of the region to be adjusted unchanged; and adjusting the area of the region to be adjusted by adjusting the contour of the region to be adjusted.

In conclusion, if the area of the first sub-region is greater than the area of the second sub-region, the first area adjustment amount is made to be greater than the second area adjustment amount, and if the area of the first sub-region is smaller than the area of the second sub-region, the first area adjustment amount is made to be smaller than the second area adjustment amount, so that the proportion of the region to be adjusted after the deformation processing is more harmonious.

Figure 7:
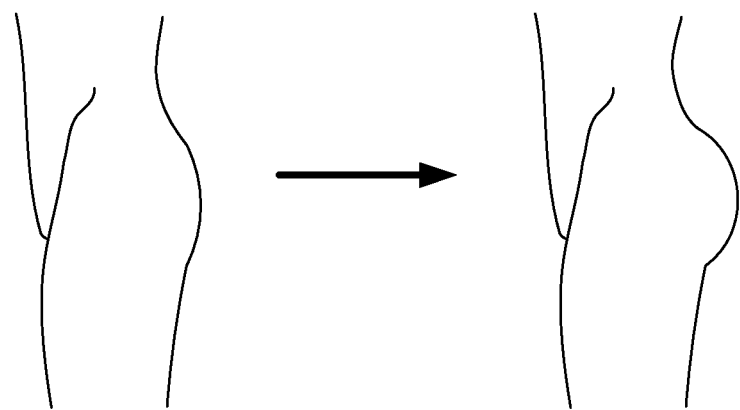
FIG. 7 is a schematic diagram of a deformation processing effect provided in the embodiments of the present disclosure.
Figure 8:
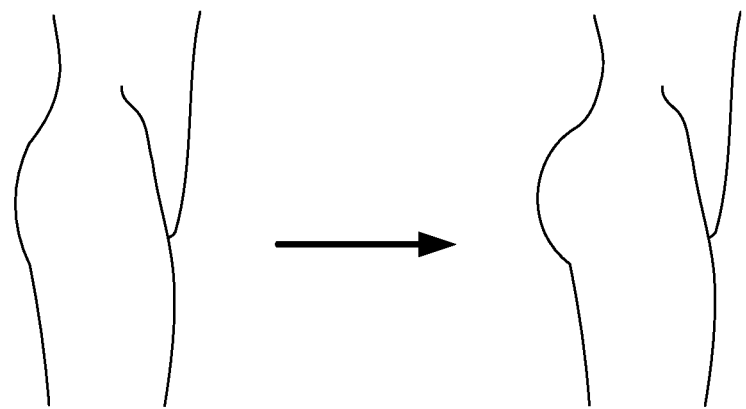
FIG. 8 is a schematic diagram of another deformation processing effect provided in the embodiments of the present disclosure.
Figure 9:
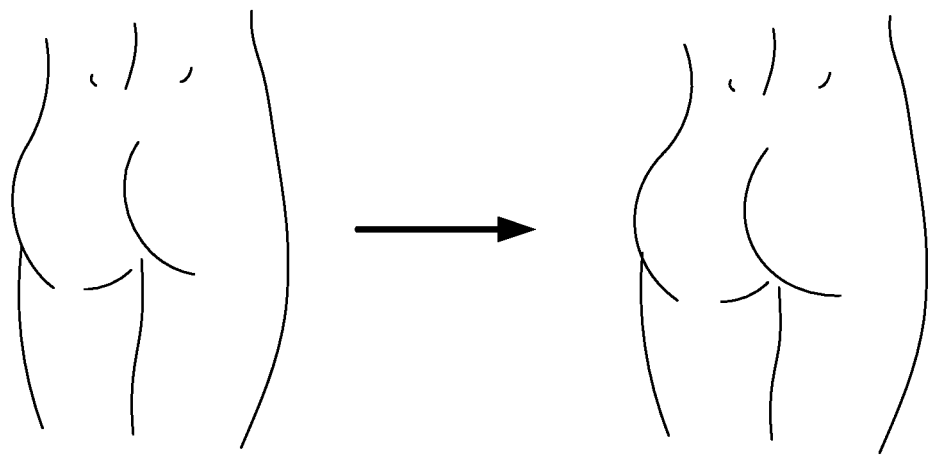
FIG. 9 is a schematic diagram of still another deformation processing effect provided in the embodiments of the present disclosure.

FIG. 7 to FIG. 9 of the present disclosure are schematic diagrams of hip enlargement deformation effects.

In FIG. 7, the crotch region of the human body is oriented toward the left, and because the hip region nearer to the left is hidden in the image, hip enlargement processing is merely required to be performed on the hip region of the human body nearer to the right. As shown in FIG. 7, after the hip enlargement processing (i.e., the deformation processing above), it can be obviously seen in the right drawing of FIG. 7 that the right hip region is augmented.

In FIG. 8, the crotch region of the human body is oriented toward the right, and because the hip region of the human body nearer to the right is hidden in the image, hip enlargement processing is merely required to be performed on the hip region of the human body nearer to the left. As shown in FIG. 8, after the hip enlargement processing, it can be obviously seen in the right drawing of FIG. 8 that the left hip region is augmented.

Figure 10:
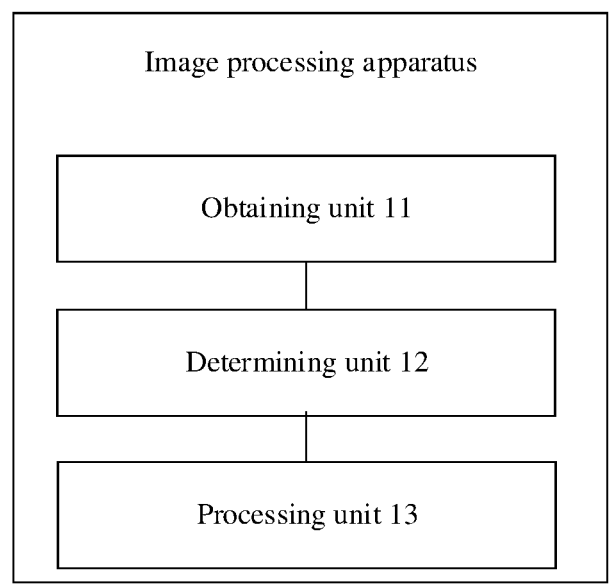
FIG. 10 is a schematic structural diagram of an image processing apparatus provided in the embodiments of the present disclosure.

The orientation of the reference region (i.e., the hip region) shown in FIG. 9 is different from the first reference vector, and the orientation of the reference region is different from the direction of the second reference vector. In order to avoid the occurrence of distortion of the hip region caused by the hip enlargement processing, the size relationship between the area of the left hip region and the area of the right hip region can be determined according to the first included angle (the included angle between the orientation of the reference region and the first reference vector) and the second included angle (the included angle between the reference region and the second reference vector), thereby achieving the hip enlargement processing. In FIG. 9, because the area of the left hip region is smaller than the area of the right hip region, the area adjustment amount of the left hip region is smaller than the area adjustment amount of the right hip region As shown in FIG. 10, the embodiments provide an image processing apparatus, including:

an obtaining unit 11, configured to obtain key points of a reference region of an object in an image;

a determining unit 12, configured to determine the orientation of the reference region according to the key points of the reference region; and a processing unit 13, configured to perform deformation processing on a region to be adjusted of the object based on the orientation of the reference region, where the region to be adjusted is the same as or different from the reference region.

According to any of the implementations in the present application, the determining unit 12 is configured to:

obtain at least three key points in the reference region, where the at least three key points are not on a same straight line;

determine a target vector based on the at least three key points; and take the direction of the target vector as the orientation of the reference region.

According to any of the implementations in the present application, the at least three key points include a first key point, a second key point, and a third key point, and the first key point and the third key point are symmetrical about the second key point.

The determining unit 12 is configured to:
construct a first vector based on the first key point and the second key point;
construct a second vector based on the third key point and the second key point; and
determine the target vector based on the first vector and the second vector.

According to any of the implementations in the present application, the determining unit 12 is configured to:
obtain the target vector by performing a cross product on the first vector and the second vector.

According to any of the implementations in the present application, the processing unit 13 is configured to:
determine the orientation of the region to be adjusted based on the orientation of the reference region; and
perform the deformation processing on the region to be adjusted of the object based on the orientation of the region to be adjusted.

According to any of the implementations in the present application, the processing unit 13 is configured to:
if the region to be adjusted is a region of a first type, determine that the orientation of the region to be adjusted is opposite to the orientation of the reference region, where the region of the first type includes: a hip region; and
if the region to be adjusted is a region of a second type, determine that the orientation of the region to be adjusted is the same as the orientation of the reference region, where the region of the second type includes: a face region; a shoulder region, or a crotch region.

According to any of the implementations in the present application, the processing unit 13 is configured to:
perform deformation processing on the region to be adjusted according to the target vector, a first reference vector, and a second reference vector, where the direction of the first reference vector is perpendicular to a photographing direction of the image, and the direction of the first reference vector is opposite to the direction of the second reference vector.

According to any of the implementations in the present application, the region to be adjusted includes a first sub-region and a second sub-region, and the first sub-region and the second sub-region are symmetrical about the center line of the region to be adjusted.

The processing unit 13 is configured to:
if the direction of the target vector is different from the direction of the first reference vector and the direction of the target vector is different from the direction of the second reference vector, adjust the area of the first sub-region and the area of the second sub-region according to a first included angle between the target vector and the first reference vector and a second included angle between the target vector and the second reference vector.

According to any of the implementations in the present application, the processing unit 13 is configured to:
determine a first area adjustment amount of the first sub-region and a second area adjustment amount of the second sub-region according to the first included angle and the second included angle; and
adjust the area of the first sub-region according to the first area adjustment amount and adjust the area of the second sub-region according to the second area adjustment amount.

According to any of the implementations in the present application, the processing unit 13 is configured to:
if the first included angle is greater than the second included angle and the area of the first sub-region is greater than the area of the second sub-region, take the ratio of the first area adjustment amount to the second area adjustment amount as a first ratio, and take the ratio of the first included angle to the second included angle as a second ratio; and determine the first area adjustment amount and the second area adjustment amount according to the second ratio so that the first ratio is positively correlated with the second ratio.

According to any of the implementations in the present application, the processing unit 13 is further configured to:

if the first included angle is equal to the second included angle, determine that the first area adjustment amount is equal to the second area adjustment amount.

Figure 11:
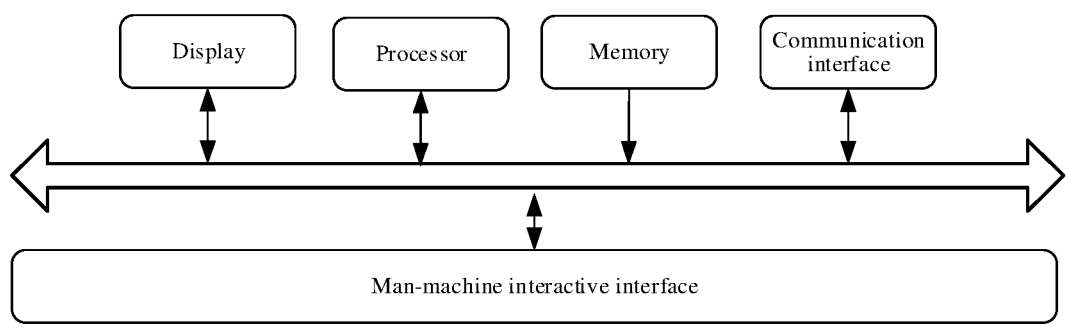
FIG. 11 is a schematic structural diagram of an image device provided in the embodiments of the present disclosure.

As shown in FIG. 11, the embodiments provide an image device, including:

a memory; and a processor, connected to the memory, and configured to execute computer executable instructions stored on the memory to implement the image processing method provided in one or more of the foregoing embodiments, for example, one or more of the image processing methods as shown in FIG. 2 and FIG. 4.

The memory may be different types of memories, such as a random memory, a Read-Only Memory (ROM), and a flash memory. The memory may be used for storing informations, such as computer executable instructions. The computer executable instructions may be different program instructions, such as target program instructions and/or source program instructions.

The processor may be different types of processors, such as a central processing unit, a microprocessor, a digital signal processor, a programmable array, a digital signal processor, a specific integrated circuit, or an image processor.

The processor may be connected to the memory by means of a bus. The bus may be an integrated circuit bus and the like.

In some embodiments, the image device may further include a communication interface. The communication interface may include a network interface, such as a local area network interface and a transceiving antenna. The communication interface is also connected to the processor, and can be used for information receiving and transmitting.

In some embodiments, the electronic device further includes a man-machine interactive interface. For example, the man-machine interactive interface may include different input/output devices, such as a keyboard and a touch screen.

The embodiments provide a computer storage medium, where the computer storage medium stores computer executable instructions, and after the computer executable instructions are executed, the image processing method provided in one or more of the foregoing embodiments, for example, one or more of the image processing methods shown in FIG. 2 and FIG. 4, can be implemented.

The computer storage medium may be different recording media having a recording function, for example, different types of storage media such a CD, a floppy disk, a hard disk drive, a magnetic tape, an optical disk, a USB flash disk, and a mobile hard disk drive. Optionally, the computer storage medium may be a non-instantaneous storage medium, and the computer storage medium may be read by a processor, so that after the computer executable instructions stored on a computer storage mechanism are obtained and executed by the processor, an information processing method provided by any of the foregoing technical solutions can be implemented, for example, the information processing method applied to a terminal device or the information processing method applied to a server is executed.

The embodiments further provide a computer program product, where the computer program product includes computer executable instructions, and after the computer executable instructions are executed, the image processing method provided in one or more of the foregoing embodiments, for example, one or more of the image processing methods shown in FIG. 2 and FIG. 4, can be implemented.

The computer program product includes a computer program tangibly included in the computer storage medium. The computer program includes a program code for executing a method shown in the flowchart, and the program code includes corresponding instructions for correspondingly executing the operations of the method provided in the embodiments of the present application.

It should be understood that the disclosed device and method in the embodiments provided in the present application may be implemented by other modes. The device embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections among the components may be implemented by means of some interfaces. The indirect couplings or communication connections between the devices or units may be implemented in electronic, mechanical, or other forms.

The units described as separate components may or may not be physically separate, and the components displayed as units may or may not be physical units, may be located at one position, or may be distributed on a plurality of network units. Some or all of the units may be selected according to actual needs to achieve the objectives of the solutions of the embodiments.

In addition, the functional units in the embodiments of the present disclosure may be integrated into one processing module, or each of the units may exist as an independent unit, or two or more units are integrated into one unit, and the integrated unit may be implemented in the form of hardware, or may also be implemented in the form of a hardware and software functional unit.

A person of ordinary skill in the art may understand that: all or some operations of implementing the forgoing method embodiments may be achieved by a program by instructing related hardware; the foregoing program may be stored in a computer-readable storage medium; when the program is executed, operations including the foregoing method embodiments are performed; moreover, the foregoing storage medium includes various media capable of storing the program codes, such as a portable storage device, a ROM, a Random Access Memory (RAM), a magnetic disk, or an optical disk.

The descriptions above merely involve specific implementations of the present disclosure. However, the scope of protection of the present disclosure is not limited thereto. Within the technical scope disclosed by the present disclosure, any variation or substitution that can be easily conceived of by a person skilled in the art should all be included within the scope of protection of the present disclosure. Therefore, the scope of protection of the present disclosure should be defined by the scope of protection of the claims.

The invention claimed is:

1. An image processing method, comprising:

obtaining key points of a reference region of an object in an image;

determining an orientation of the reference region according to the key points of the reference region; and performing deformation processing on a region to be adjusted of the object based on the orientation of the reference region, wherein the region to be adjusted is the same as or different from the reference region, wherein determining the orientation of the reference region according to the key points of the reference region comprises:

obtaining at least three key points in the reference region, wherein the at least three key points are not on a same straight line;

determining a target vector based on the at least three key points; and taking a direction of the target vector as the orientation of the reference region.

2. The method according to claim 1, wherein the at least three key points comprise a first key point, a second key point, and a third key point, and the first key point and the third key point are symmetrical about the second key point;

determining the target vector based on the at least three key points comprises:

constructing a first vector based on the first key point and the second key point;

constructing a second vector based on the third key point and the second key point; and determining the target vector based on the first vector and the second vector.

3. The method according to claim 1, wherein performing the deformation processing on the region to be adjusted of the object based on the orientation of the reference region comprises:

determining an orientation of the region to be adjusted based on the orientation of the reference region; and performing the deformation processing on the region to be adjusted of the object based on the orientation of the region to be adjusted.

4. The method according to claim 3, wherein determining the orientation of the region to be adjusted based on the orientation of the reference region comprises:

in response to the region to be adjusted being a region of a first type, determining that the orientation of the region to be adjusted is opposite to the orientation of the reference region, wherein the region of the first type comprises: a hip region; and in response to the region to be adjusted being a region of a second type, determining that the orientation of the region to be adjusted is the same as the orientation of the reference region, wherein the region of the second type comprises at least one of: a face region, a shoulder region, or a crotch region.

5. The method according to claim 1, wherein performing the deformation processing on the region to be adjusted of the object based on the orientation of the reference region comprises:

performing the deformation processing on the region to be adjusted according to the target vector, a first reference vector, and a second reference vector, wherein a direction of the first reference vector is perpendicular to a photographing direction of the image, and the direction of the first reference vector is opposite to a direction of the second reference vector.

6. The method according to claim 5, wherein the region to be adjusted comprises a first sub-region and a second sub-region, and the first sub-region and the second sub-region are symmetrical about a center line of the region to be adjusted;

performing the deformation processing on the region to be adjusted according to the target vector, the first reference vector, and the second reference vector comprises:

in response to the direction of the target vector being different from the direction of the first reference vector and the direction of the target vector being different from the direction of the second reference vector, adjusting an area of the first sub-region and an area of the second sub-region according to a first included angle between the target vector and the first reference vector and a second included angle between the target vector and the second reference vector.

7. The method according to claim 6, wherein in response to the direction of the target vector being different from the direction of the first reference vector and the direction of the target vector being different from the direction of the second reference vector, adjusting the area of the first sub-region and the area of the second sub-region according to the first included angle between the target vector and the first reference vector and the second included angle between the target vector and the second reference vector comprises:

determining a first area adjustment amount of the first sub-region and a second area adjustment amount of the second sub-region according to the first included angle and the second included angle; and adjusting the area of the first sub-region according to the first area adjustment amount and adjusting the area of the second sub-region according to the second area adjustment amount.

8. The method according to claim 7, wherein determining the first area adjustment amount of the first sub-region and the second area adjustment amount of the second sub-region according to the first included angle and the second included angle comprises:

in response to the first included angle being greater than the second included angle and the area of the first sub-region being greater than the area of the second sub-region, taking a ratio of the first area adjustment amount to the second area adjustment amount as a first ratio, and taking a ratio of the first included angle to the second included angle as a second ratio; and determining the first area adjustment amount and the second area adjustment amount according to the second ratio so that the first ratio is positively correlated with the second ratio;

in response to the first included angle being equal to the second included angle, determining that the first area adjustment amount is equal to the second area adjustment amount.

9. An image processing device, comprising:

a processor; and a memory for storing instructions executable by the processor, wherein when the instructions are executed by the processor, the processor is configured to:

obtain key points of a reference region of an object in an image;

determine an orientation of the reference region according to the key points of the reference region; and perform deformation processing on a region to be adjusted of the object based on the orientation of the reference region, wherein the region to be adjusted is the same as or different from the reference region, wherein the processor is specifically configured to:

obtain at least three key points in the reference region, wherein the at least three key points are not on a same straight line;

determine a target vector based on the at least three key points; and
take a direction of the target vector as the orientation of the reference region.

10. The device according to claim 9, wherein the at least three key points comprise a first key point, a second key point, and a third key point, and the first key point and the third key point are symmetrical about the second key point; the processor is specifically configured to:
construct a first vector based on the first key point and the second key point;
construct a second vector based on the third key point and the second key point; and
determine the target vector based on the first vector and the second vector.

11. The device according to claim 9, wherein the processor is specifically configured to:
determine an orientation of the region to be adjusted based on the orientation of the reference region; and
perform the deformation processing on the region to be adjusted of the object based on the orientation of the region to be adjusted.

12. The device according to claim 11, wherein the processor is specifically configured to:
in response to the region to be adjusted being a region of a first type, determine that the orientation of the region to be adjusted is opposite to the orientation of the reference region, wherein the region of the first type comprises: a hip region; and
in response to the region to be adjusted being a region of a second type, determine that the orientation of the region to be adjusted is the same as the orientation of the reference region, wherein the region of the second type comprises at least one of: a face region, a shoulder region, or a crotch region.

13. The device according to claim 9, wherein the processor is specifically configured to:
perform the deformation processing on the region to be adjusted according to the target vector, a first reference vector, and a second reference vector, wherein a direction of the first reference vector is perpendicular to a photographing direction of the image, and the direction of the first reference vector is opposite to a direction of the second reference vector.

14. The device according to claim 13, wherein the region to be adjusted comprises a first sub-region and a second sub-region, and the first sub-region and the second sub-region are symmetrical about a center line of the region to be adjusted;
the processor is specifically configured to:
in response to the direction of the target vector being different from the direction of the first reference vector and the direction of the target vector being different from the direction of the second reference vector, adjust an area of the first sub-region and an area of the second sub-region according to a first included angle between the target vector and the first reference vector and a second included angle between the target vector and the second reference vector.

15. The device according to claim 14, wherein the processor is specifically configured to:
determine a first area adjustment amount of the first sub-region and a second area adjustment amount of the second sub-region according to the first included angle and the second included angle; and
adjust the area of the first sub-region according to the first area adjustment amount and adjust the area of the second sub-region according to the second area adjustment amount.

16. The device according to claim 15, wherein the processor is specifically configured to:
in response to the first included angle being greater than the second included angle and the area of the first sub-region being greater than the area of the second sub-region, take a ratio of the first area adjustment amount to the second area adjustment amount as a first ratio, and take a ratio of the first included angle to the second included angle as a second ratio; and
determine the first area adjustment amount and the second area adjustment amount according to the second ratio so that the first ratio is positively correlated with the second ratio;
in response to the first included angle being equal to the second included angle, determine that the first area adjustment amount is equal to the second area adjustment amount.

17. A non-transitory computer storage medium, wherein the non-transitory computer storage medium stores computer executable instructions, and execution of the computer executable instructions by a processor causes the processor to perform:
obtaining key points of a reference region of an object in an image;
determining an orientation of the reference region according to the key points of the reference region; and
performing deformation processing on a region to be adjusted of the object based on the orientation of the reference region, wherein the region to be adjusted is the same as or different from the reference region,
wherein determining the orientation of the reference region according to the key points of the reference region comprises:
obtaining at least three key points in the reference region, wherein the at least three key points are not on a same straight line;
determining a target vector based on the at least three key points; and
taking a direction of the target vector as the orientation of the reference region.

* * * * *